United States Patent [19]
Comerford et al.

[11] 4,208,002
[45] Jun. 17, 1980

[54] WAVE SOLDERING SYSTEM

[75] Inventors: Matthias F. Comerford, New Highlands, Mass.; Thomas N. Munroe, Hudson; Harold T. O'Rourke, Milford, both of N.H.

[73] Assignee: Hollis Engineering, Inc., Nashua, N.H.

[21] Appl. No.: 934,803

[22] Filed: Aug. 18, 1978

[51] Int. Cl.² ............................................. B23K 3/06
[52] U.S. Cl. .................................................... 228/37
[58] Field of Search ................... 228/37, 260; 118/429

[56] References Cited

U.S. PATENT DOCUMENTS

| | | | |
|---|---|---|---|
| 3,398,873 | 8/1968 | Wegener et al. | 228/37 |
| 3,726,465 | 4/1973 | Boynton et al. | 228/37 |
| 3,773,242 | 11/1973 | Fitzsimmons | 228/37 |
| 3,930,465 | 1/1976 | Schuierer | 118/429 X |
| 3,989,180 | 11/1976 | Tardoskegyi | 228/37 X |

*Primary Examiner*—Daniel C. Crane
*Assistant Examiner*—K. J. Ramsey
*Attorney, Agent, or Firm*—Strimbeck & Soloway

[57] ABSTRACT

A mass wave soldering apparatus is described. The apparatus comprises a sump having upwardly diagonally extending front and rear walls, and a pair of vertical end walls which cooperate to form an upwardly extending open ended nozzle chamber of increasing plan area. A Z-shaped baffle screen is positioned within the nozzle chamber and distributes the molten solder pumped upwardly in the sump as a wide, smooth substantially unidirectional solder wave ideally contoured for high-speed production soldering.

22 Claims, 4 Drawing Figures

WAVE SOLDERING SYSTEM

This invention relates generally to soldering and, more particularly, to wave soldering apparatus in which a standing wave of molten solder is produced above a reservoir of molten solder, and a printed circuit board or the like having component leads or protruding pins depending therefrom is passed in contact with the top surface of the wave whereby to deposit molten solder on the board and depending leads or pins. Wave soldering apparatus of this type have been used commercially for various applications, but they are particularly suitable for mass connecting with solder electrical and electronic components by their leads, onto printed circuit boards.

Wave soldering apparatus are well known in the art. A typical prior art wave soldering apparatus comprises a reservoir for molten solder and a sump partially submerged in the reservoir. The sump has an inlet orifice adjacent its lower end, and an elongate outlet nozzle or slot adjacent the sump upper end. A positive displacement pump is submerged in the body of the solder and is adapted to force molten solder into the sump inlet and upwardly in the sump to overflow the outlet nozzle to thereby provide a smoothly rounded standing wave of molten solder above the nozzle.

The ideal wave soldering apparatus should generate a smooth, air-free, non-turbulent solder wave, free of dross and other oxides, so as to deposit a shiny coating of solder on the contacts to be soldered, free of solder icicles and/or bridges between contacts. Solder icicling and bridging is believed attributable to the web (sometimes called "backwash") which forms between the printed circuit board and the surface of the wave of solder as the circuit board leaves the solder wave. In order to reduce the incidence of solder icicles and bridges the art has proposed various approaches. One approach which has been widely adopted by the industry for reducing solder icicles and bridges is to intermix oil in the solder wave. The oil is believed to reduce surface tension of the molten solder and thus reduce solder bridges and icicles. The presence of oil is also said to provide an oxidation barrier on the surface of the solder, permit soldering to be effected at lower temperature, minimize deposit of solder on the part to be soldered, impart a shinier appearance to the solder deposit, and permit considerably more leeway in solder temperature, immersion depth and the speed at which the article may be passed across the solder wave. Thus, wave soldering apparatus with provision for mixing oil into the solder wave has proved itself capable of successfully and efficiently mass soldering printed circuits and other articles with minimum formation of solder icicles and bridges. Various forms of wave soldering apparatus with provision for adding oil to the solder wave are well known in the art and are described in numerous patents, including U.S. Pat. Nos. 3,058,441, 3,151,592, 3,398,873, 3,438,386 and 3,612,388. Another approach which also has been widely adopted by the art is to move the circuit board at a slight incline through the solder wave so that gravity aids in pulling back the solder web.

The art has also experimented with wave dynamics and geometry for minimizing formation of solder icicles and bridges. One form of wave geometry which has achieved significant attention by the art in recent years is to extend the working length of the wave in one direction, i.e. as a so-called "unidirectional" or "one-way" wave. In order to produce an unidirectional wave an upwardly extending lip or wall is provided on one side of the solder nozzle. The upwardly extending lip acts as a dam to divert the bulk of the solder in the standing wave to fall-off over the opposite side of the sump, i.e. over the lower lip. Typically a substantially horizontal support plate is provided adjacent the lower lip to support and lengthen the wave in the direction of solder flow. Actually, in most unidirectional wave soldering machines a minor component of the wave also overflows the upwardly extending lip as well. However, since most of the solder flow is over the lower lip the term "unidirectional" solder wave is employed by the art to describe such machines. Various forms of apparatus for forming substantially unidirectional wave soldering machines are known in the art and are illustrated in U.S. Pat. Nos. 3,037,274, 3,379,356, 3,407,984, 3,605,244 and 3,993,235. While such patented system are said to reduce the formation of solder icicles and bridges in some situations, it sometimes is difficult to maintain a smooth wave surface over the entire working expanse of the extended wave.

It is thus an object of the present invention to provide a novel and improved wave soldering apparatus which overcomes the aforesaid problems of the prior art. Another object is to provide a novel and improved wave soldering apparatus which is capable of producing an exceptionally smooth solder wave of extended working length. Still other objects are to provide a wave soldering apparatus of the foregoing type which is capable of producing a wide, smooth standing solder wave ideally contoured for high-speed production soldering, and which assures substantially solder icicle-and bridge-free soldering even without introducing oil into the solder wave.

Still other objects will in part appear obvious and will in part appear hereinafter.

The invention accordingly comprises the apparatus possessing the features, properties and relations of elements which are exemplified in the following detailed disclosure and the scope of the application of which will be indicated in the claims.

Generally, the present invention involves a mass wave soldering apparatus which comprises a sump having upwardly diagonally extending front and rear walls, and a pair of vertical end walls which cooperate to form an upwardly extending open ended nozzle chamber of increasing plan area. A Z-shaped baffle screen is positioned within the nozzle chamber and distributes the molten solder pumped upwardly in the sump as a wide, smooth solder wave ideally contoured for high-speed production soldering.

For a fuller understanding of the present invention reference should be had to the following detailed description taken in connection with the accompanying drawings in which.

Figure 1:
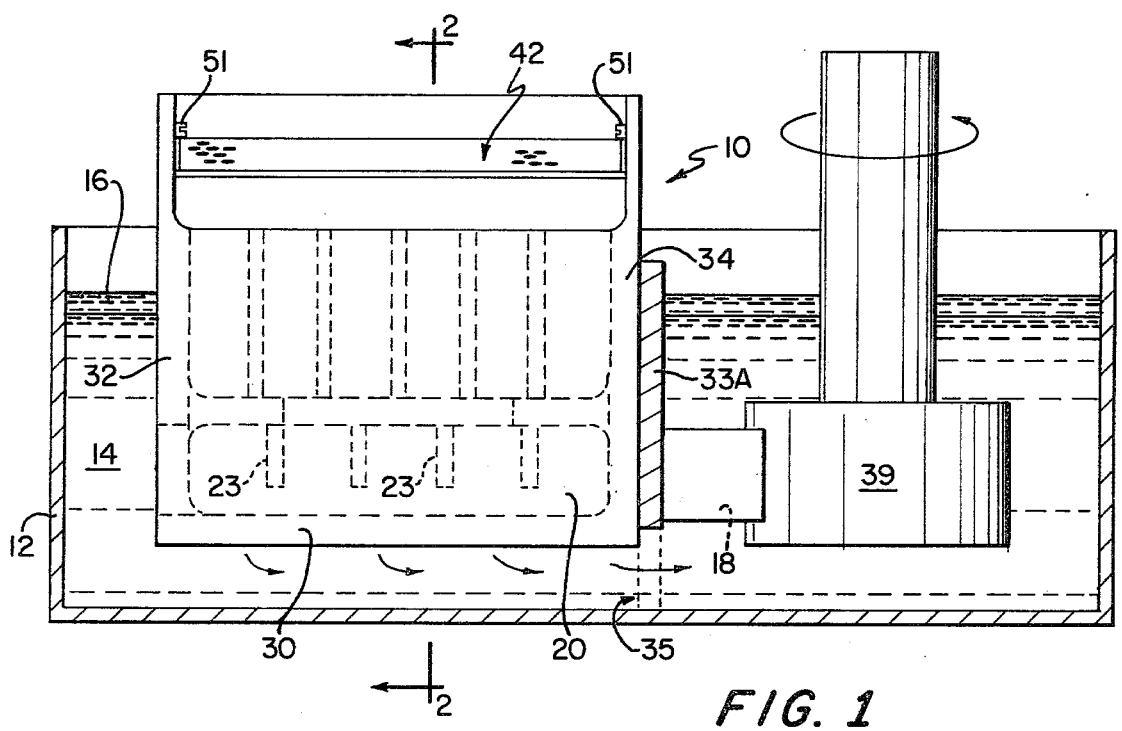
FIG. 1 is a schematic front elevational view of a preferred form of wave soldering apparatus of the present invention with the solder reservoir shown in cross-section.

Referring to the drawings the illustrated wave generating apparatus of the present invention includes a solder sump 10 which is partially submerged in a reservoir container 12 containing molten solder 14 which may or may not have a layer of oil 16 floating on top of the solder.

Figure 2:
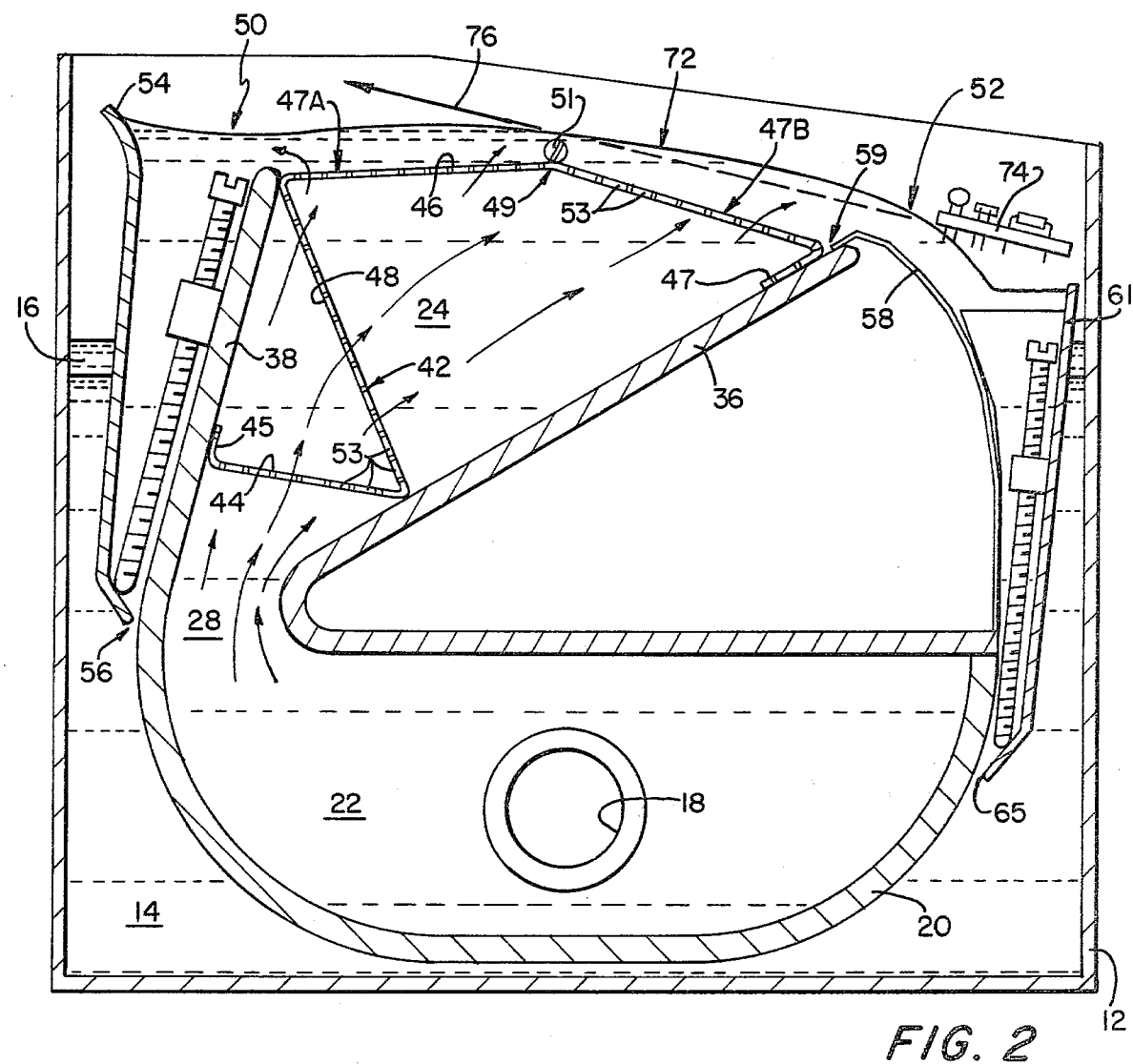
FIG. 2 is a cross-sectional view taken along the line 2—2 of FIG. 1.

As seen particularly in FIGS. 1 and 2, sump 10 includes an intake orifice 18, and a tubular housing 20 which encloses an elongated intake lower chamber 22. The latter extends transversely across the lower region of the sump 10. Four vertical perforated baffles 23 (FIG. 1) are mounted with the housing 20 to equalize solder flow and minimize channeling in the lower chamber 22. The upper region of sump 10 comprises an upwardly extending open ended chamber 24. Open ended chamber 24 has an increasing plan area, and terminates in a discharge opening 26 of relatively large cross-sectional area at the upper end of the chamber 24. Intake chamber 22 and open ended chamber 24 are connected together by a narrow, elongated passageway 28 which passageway provides fluid communication between the two chambers. Sump 10 includes a bottom wall 30, vertical side walls 32 and 34, and front and rear walls 36 and 38 which extend generally vertically upwardly from the bottom wall 30. As seen particularly in FIG. 2, the front and rear walls 36 and 38, respectively, extend upwardly at a slant from passageway 28. Both walls 36 and 38 slant in the same general direction from the vertical; however, front wall 36 is at a substantially greater angle to vertical than back wall 38 with the result that a discharge opening of increasing cross-sectional area is defined. By way of example but not limitation front wall 36 may be slanted upwardly at an angle in the range of about 55° to 65° from the vertical, preferably about 60°, while back wall 38 may be slanted upwardly at an angle of from about 10° to 20° from the vertical, preferably about 15°. Also, front wall 36 extends to a slightly lower vertical height than back wall 38. The purpose of this will become clear from the description following.

A conventional solder pump 39 is submerged within reservoir 12 and supplies molten solder from the reservoir to intake orifice 18. Preferably pump 39 comprises a rotary impeller-type pump and is driven by a variable speed electric motor (not shown). Further details of the pump are not critical to an understanding of or practice of the present invention and have therefore been omitted.

Figure 4:
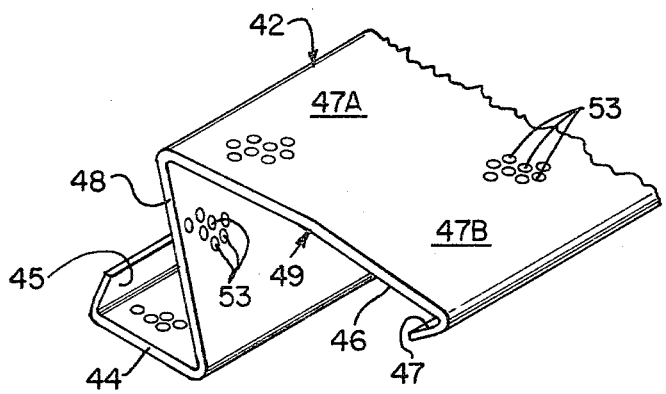
FIG. 4 is a perspective view showing the baffle screen used in the soldering apparatus of the present invention.

An important feature and advantage of the present invention is the ability to produce a standing solder wave having a smooth upper end surface of extended length which is ideally contoured for high speed soldering. This feature and advantage is made possible by providing a Z-shaped baffle screen 42 mounted in the open-ended chamber 24 of sump 10. Baffle screen 42 provides the two-fold effects, in combination with sump 10 of (1) substantially uniformly distributing the flow of molten solder as it rises upwardly in chamber 24, and (2) channeling the flow of molten solder to form a standing wave having an extended upper end surface. Baffle screen 42 includes a generally horizontal lower section 44, a generally horizontal upper section 46, and an inclined web section 48 which connects the upper and lower sections. As seen particularly in FIGS. 2 and 4, the baffle screen upper section 46 comprises two essentially planar broad portions 47A, 47B, respectively, which are merged together by a relatively narrow, slightly downwardly curved portion 49. Preferably baffle screen 42 includes a plurality of evenly spaced apertures or holes 53. By way of example holes 53 may comprise round holes approximately 0.125 inch in diameter, 33 holes per square inch, resulting in baffle screen having an open area of approximately 41.7%. Preferably baffle screen 42 is formed in a single piece from perforated plate having apertures of the aforesaid size and spacing. Preferably, the edges 45 and 47 of the baffle screen 42, i.e. adjacent lower section 44 and upper section 46, respectively are folded over as shown in FIGS. 2 and 4 to stiffen the baffle screen and to guide the screen position in the sump chamber 24. Baffle screen 42 is held in place in the sump chamber by locating pins, clips or screws 51 which are provided adjacent the top edge of the sump side walls 32 and 34, respectively. One skilled in the art will recognize that baffle screen 42 may be fixed in position in the sump by other mechanical fastening means. Baffle screen 42 is sized to fit snugly within chamber 24. As mentioned previously the plan area of chamber 24 increases with height; accordingly, baffle plate lower section 44 necessarily will be smaller in plan than baffle plate upper section 46. Moreover, baffle plate upper section 46 should be slightly larger in plan than discharge opening 26, so that when the edges of baffle section 46 are positioned substantially even with the top edges of sump front and rear walls 36 and 38, respectively, the screen upper section curved portion 49 will be higher vertically than both the sump front and back walls 36 and 38, respectively.

The vertical separation distance between lower and upper baffle plate sections 44 and 46, respectively, per se is not critical to the practice of the present invention. However, the angle of inclination of web 48 should be in the range of from about 20° to 40° from the vertical. Preferably web 48 is inclined approximately 30° from the vertical. Lower baffle plate section 44 should be sized to fit snugly in chamber 24 when the upper baffle plate section is positioned substantially even with the top edges of the sump front and rear walls 36 and 38. One skilled in the art will recognize that lower baffle plate section 44 and web 48 are interrelated and their respective sizes will depend on the angle of inclination of web 48, and of course, the dimensions of the sump upper chamber 24.

Completing the sump 10 are a first solder overflow guide 50 mounted adjacent to, spaced from and cooperating with the sump rear wall 38, and a second overflow guide 52 mounted adjacent to, spaced from, and cooperating with the sump front wall 36. The first overflow guide 50 is of conventional construction and comprises a sluice plate 54 including an adjustable width gate arrangement indicated generally at 56 adjacent its lower end. As thus described overflow guide 50 is similar to the side plate sluice arrangement described in U.S. Pat. No. 3,398,873 to Howard W. Wegener and Kenneth G. Boynton.

Figure 3:
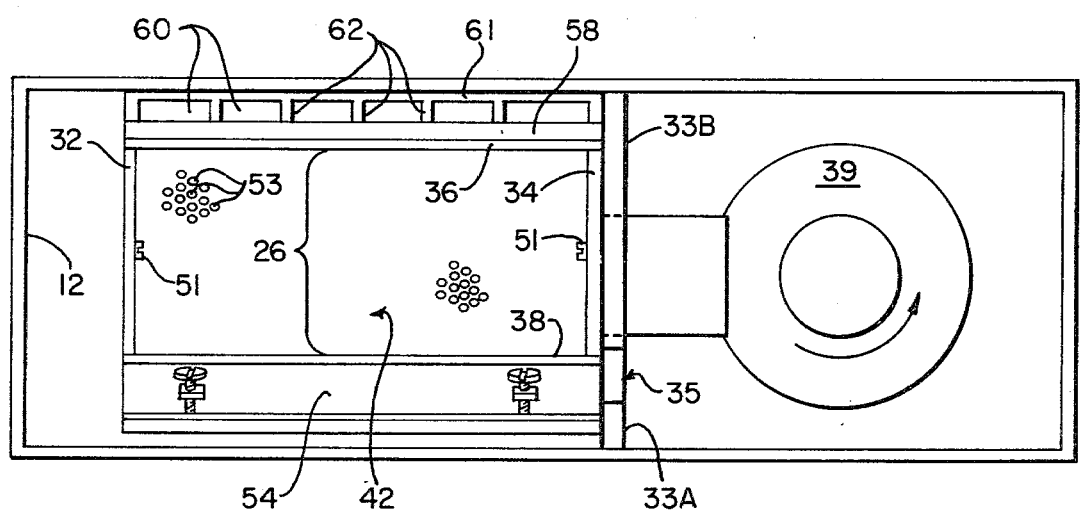
FIG. 3 is a top plan view of the apparatus of FIG. 1.

On the other hand, overflow guide 52 is especially suited for the solder sump and baffle of the instant invention. Referring to FIGS. 2 and 3 of the drawings, overflow guide 52 comprises a generally downwardly sloping wave support guide 58, and a multi-channelled sluice indicated generally at 60. The support guide 58 comprises a plurality of contiguous segments which meet at apexes to collectively form a convex flow surface. However, as seen particularly in FIG. 2, wave support guide 58 rises vertically adjacent wall 36 before the wave support guide begins its generally downward slope, thus forming a slight depression in the wave support at 59. As seen in FIG. 2 the solder wave will thus be deepest over point 59. As seen in FIG. 3, sluice 60 includes a back plate 61, channel vanes 62 and an adjustable width gate 64. Gate 64 per se also is of conventional construction and includes an adjustable width gate arrangement indicated generally at 65, adjacent its lower end, i.e. similar to gate 56 of overflow guide 50. The construction of gate 65 also is not critical to the invention and further details thereof have accordingly been omitted. On the other hand, the provision of vanes 62 to divide overflow guide 52 into a plurality of vertical channels is believed novel in an overflow sluice for a wave soldering apparatus. Moreover, dividing overflow guide 52 into a plurality of channels has been found to be important for minimizing dross formation in the instant sump and nozzle arrangement where the major volumetric portion of solder pumped through the sump flows out of the sump in one direction, i.e. over the sump lower front wall 36.

As indicated above, the design of the overflow guides 50 and 52 is critical to the satisfactory performance of a wave soldering apparatus for minimizing dross formation. However, solder overflow is not the only point where dross may be produced. A characteristic of pumps with rotating, vane-type impellers is that the hydrostatic pressure on the volume of working fluid between any two adjacent vanes is greatest immediately before the fluid is expelled through the outlet port. As each volume increment of fluid leaves the impeller, there is an abrupt decrease in mass which creates a partial vacuum that must be filled by a new volume of fluid from the feed reservoir. In the case of rotary impeller-type pumps capable of producing commercially interesting solder flow rates, the major influx of solder from the reservoir to the solder pump typically does not occur uniformly over the pump intake port cross-section, but rather may be concentrated in a small, e.g. less than about 45° arc segment immediately adjacent to, and behind, the pump exit port. Thus, with the sump 10 is in place in solder reservoir, the return flow of solder to the pump will occur predominantly through the rectangular channel formed by the sump end wall 38 and the reservoir side wall due to the fact that this channel forms the shortest return path to the aforesaid arc segment of the intake port. To provide continuity of mass flow, the fluid velocity of the solder through this channel must be relatively high. The viscosity of molten solder at normal operating temperatures is such that the solder level in the reservoir will be lower near the pump than farther away. This produces a cascade effect which in turn generates substantial surface turbulence which aerates the solder and thus promotes dross formation.

To alleviate this situation in accordance with a further aspect of this invention a set of solid baffle plates 33A and 33B are fastened to the end wall of the sump closest to the pump, i.e. end wall 32. These baffle plates 33A and 33B block the flow of solder down the aforesaid rectangular channel and reduce the surface mass flow nearly to zero. Baffles 33A and 33B are shown as comprising separate elements; however, one skilled in the art will recognize that baffles 33A and 33B may comprise a single baffle, and if desired, formed integrally with the sump end wall 32. Near the bottom of the reservoir, and approximately, but not precisely centered in the reservoir is a gateway 35 which is of sufficient size to permit efficient solder pumping; however, due to the presence and position of the gateway 35, the return flow of solder is constrained to take place substantially entirely below the surface of the solder in the reservoir. As a result the overall solder flow path is as follows: from the pump 39 into the sump 10 at intake orifice 18; then up in the sump body through baffle screen 42 and out the discharge opening 26 into the overflow guides 50 and 52, with the bulk of the solder overflowing into overflow guide 52; from there the molten solder flow is primarily below the surface through the sub-surface gateway 35 to the arc segment of the pump intake port where the inflow is concentrated. Thus, overflow guides 50 and 52 prohibit free fall of solder into the reservoir surface, which eliminates turbulence and aeration from the wave overflow, while the flow of the solder in the reservoir is controlled by solid baffle plates 33A and 33B so as to keep the surface quiescent. As a result the rate dross formation in the apparatus of the present invention is particarly low.

Operation of the soldering apparatus just described is as follows: Reservoir container 12 is charged with solder, and the solder is heated to form a melt. The solder pump is then turned on, and the speed of the motor is adjusted so that solder is pumped from the reservoir into sump 10 to fill sump 10 to the top and to then flow over the sump top into overflow guides 50 and 52. Sluice gates 56 and 64 are then adjusted until the rate of flow of solder through the gates is substantially equal to the flow of solder into the gates so as thus to maintain a constant solder level in each overflow guide, with the bulk of the solder (e.g. 90 to 99 volumetric percent) flowing into overflow guide 52. The resulting solder wave is characterized as being extremely smooth, dross free, and having an approximately parabolic or elliptical surface contour 72, deepest at 59. One skilled in the art will recognize that such a wave is ideally contoured for high-speed production mass soldering.

In using the apparatus just described circuit boards 74 are carried seriatim by a conveyor (not shown) along an inclined path 76 to bring the lower surfaces of the boards and the contacts thereon to be soldered in engagement with surface 72 of the solder wave adjacent its deepest point (i.e. over point 59). The board is then passed in contact with the parabolic surface of the wave. As the board leaves the solder wave a relatively small backwash web will tend to form between the board and solder wave. As explained above, the tendency of the wave to form icicles and bridges is a function of the size of this web. The size of web produced using soldering apparatus of the present invention has been observed to be quite small in comparison to webs produced using high peaked conventional solder apparatus producing bi-directional solder waves. Moreover, solder waves generated by the apparatus of the present invention are characterized by an extended working length between the upstream and downstream ends thereof and having a surface contour of less curvature than the waves generated by conventional unidirectional wave soldering apparatus. Thus printed circuit boards soldered using the apparatus of the present invention will be maintained in contact with the solder wave over an extended period of time which facilitates establishing and maintaining time-temperature conditions which are essential for high quality soldering results.

The wave generating apparatus of the present invention has been tested by soldering printed circuit boards at solder temperatures of 238° to 266° C. and at conveyor speeds of between 0.6 and 4.6 meters per minute, without mixing oil in the solder wave, and in general the soldering results have been comparable to or superior to the results obtained using conventional bi-directional soldering waves containing a mixture of oil. The wave generated by the apparatus of the present invention was smooth, oil and dross free, about 15 cm. deep at the soldering surface thereof, having a working length of about 65 cm. The boards were preheated to temperatures of about 40° C. to 125° C. as measured on the board top side.

The invention has been shown in a single preferred form. However, various modifications and variations may be made therein without departing from the spirit of the invention. For example, while the Z-shaped baffle screen 42 has been described as being formed as an one-piece unit formed from perforated plate, one skilled in the art will recognize that a Z-shaped baffle screen may be formed from a plurality of pieces, e.g. three pieces of perforated plate, which may be crimped or welded together to form the required Z-shaped screen. Alternatively a plurality of pieces of perforated plate may be individually mounted in the sump upper chamber 24 in a Z-shaped configuration. Moreover, aperture 53 need not comprise round holes as shown, but instead may be formed as elongated slots, or as holes having other geometric shape, i.e. triangular or hexagonal. Still other changes will be obvious to one skilled in the art.

We claim:

1. In a wave soldering apparatus comprising a reservoir for holding a supply of molten solder, a sump and nozzle adapted to be partially submerged in said supply of molten solder, said sump having a front wall, a rear wall, and a pair of side walls connecting said front and rear walls to define said nozzle, and means for introducing molten solder under pressure into the lower end of said sump whereby said solder may then flow upwardly in said sump to overflow said front and rear walls and thereafter return to said reservoir, the improvement wherein said sump and nozzle comprises an upwardly extending open-ended chamber of increasing plan area which terminates in a discharge opening of relatively large cross-sectional area at the upper end of said chamber, and including a generally Z-shaped perforated baffle positioned within said upwardly extending open-ended chamber, said perforated baffle including an upper section which is bowed slightly upwardly beyond said front and rear walls.

2. In a wave soldering apparatus as claimed in claim 1 wherein said perforated baffle includes a lower section of substantially smaller plan area than said upper section, and including also a web section joining said upper and lower sections.

3. In a wave soldering apparatus according to claim 2 wherein said web section is inclined at an angle in the range of about 20° to 40° from the vertical when said baffle is positioned in said sump and nozzle.

4. In a wave soldering apparatus as claimed in claim 1, including first and second solder overflow return passages adjacent said sump and nozzle, said first solder overflow passage including a sluice means and cooperating adjustable gate means, and said second solder overflow passage including a generally downwardly sloping wave extender member, and a sluice means and cooperating adjustable gate means.

5. In a wave soldering apparatus according to claim 4, including a plurality of vanes dividing said sluice means into a plurality of generally vertical channels.

6. In a wave soldering apparatus according to claim 4, wherein said downwardly sloping wave extender comprises a support member. including a plurality of contiguous segments which meet at apexes to collectively form a convex flow surface.

7. In a wave soldering apparatus according to claim 4, wherein said means for introducing under pressure comprises a rotary impeller-type pump, and including solid baffle means for directing the flow of molten solder from said overflow passages in a constrained path below the surface of said solder in said reservoir.

8. In a wave soldering apparatus according to claim 7, wherein said solid baffle means comprise at least one baffle plate fixed to the end wall of said sump nearest said pump, and including a gateway through said solid baffle means below said surface of said solder in said reservoir.

9. In a wave soldering apparatus according to claim 1 wherein said perforated baffle comprises a plurality of evenly spaced, evenly sized apertures.

10. In a wave soldering apparatus according to claim 1 and further comprising means for fixedly positioning said perforated baffle in said sump.

11. In a wave soldering apparatus according to claim 1 wherein said baffle upper section comprises two essentially planar relatively broad portions which are merged together at a relatively narrow, slightly downwardly curved section.

12. In a wave soldering apparatus comprising a reservoir for holding a supply of molten solder, a sump and nozzle adapted to be partially submerged in said supply of molten solder, said sump having a front wall, a rear wall, and a pair of side walls connecting said front and rear walls to define said nozzle, and means for introducing molten solder under pressure into the lower end of said sump whereby said solder may then flow upwardly in said sump to overflow said front and rear walls and thereafter return to said reservoir, the improvement wherein said sump and nozzle comprises (1) an upwardly extending open-ended chamber of increasing plan area which terminates in a discharge opening of relatively large cross-sectional area at the upper end of said chamber, (2) a first solder overflow return passage including a sluice means and cooperating adjustable gate means adjacent said sump and nozzle, (3) a second solder overflow return passage including a generally downwardly sloping wave extender member, and a sluice means and cooperating adjustable gate means adjacent said sump and nozzle, and (4) a generally Z-shaped perforated baffle, positioned within said upwardly extending open-ended chamber.

13. In a wave soldering apparatus according to claim 12, wherein said perforated baffle includes an upper section which is positioned substantially even with top wall edges of said front and rear walls.

14. In a wave soldering apparatus according to claim 13 wherein said baffle upper section comprises two essentially planar relatively broad portions which are merged together at a relatively narrow, slightly downwardly curved section.

15. In a wave soldering apparatus as claimed in claim 12, wherein said perforated baffle includes a lower section of substantially smaller plan area than said upper section, and including also a web section joining said upper and lower sections.

16. In a wave soldering apparatus according to claim 15 wherein said web section is inclined at an angle in the range of about 20° to 40° from the vertical when said baffle is positioned in said sump and nozzle.

17. In a wave soldering apparatus according to claim 12 including a plurality of vanes dividing said sluice means into a plurality of generally vertical channels.

18. In a wave soldering apparatus according to claim 12 wherein said perforated baffle comprises a plurality of evenly spaced, evenly sized apertures.

19. In a wave soldering apparatus according to claim 12 and further comprising means for fixedly positioning said perforated baffle in said sump.

20. In a wave soldering apparatus according to claim 12 wherein said downwardly sloping wave extender comprises a support member including a plurality of contiguous segments which meet at apexes to collectively form a convex flow surface.

21. In a wave soldering apparatus according to claim 12, wherein said means for introducing under pressure comprises a rotary impeller-type pump, and including solid baffle means for directing the flow of molten solder from said overflow passages in a constrained path below the surface of said solder in said reservoir.

22. In a wave soldering apparatus according to claim 21, wherein said solid baffle means comprise at least one baffle plate fixed to the end wall of said sump nearest said pump, and including a gateway through said solid baffle means below said surface of said solder in said reservoir.

* * * * *